US006135676A

United States Patent [19]

Anderson

[11] Patent Number: 6,135,676

[45] Date of Patent: Oct. 24, 2000

[54] SYSTEM AND METHOD FOR BULK HANDLING CLOSURES

[75] Inventor: James Anderson, Chesterfield, Va.

[73] Assignee: Crown Cork & Seal Technologies Corporation, Alsip, Ill.

[21] Appl. No.: 08/997,268

[22] Filed: Dec. 23, 1997

[51] Int. Cl.[7] .................... B65G 53/04

[52] U.S. Cl. .................... 406/38; 406/116

[58] Field of Search .................... 406/116, 115, 406/113, 108, 38, 164, 39

[56] References Cited

U.S. PATENT DOCUMENTS

| | | | |
|---|---|---|---|
| 1,445,296 | 2/1923 | Clark . | |
| 2,696,285 | 12/1954 | Zenlea | 193/43 |
| 2,952,104 | 9/1960 | Stover | 53/3 |
| 3,656,605 | 4/1972 | Gess | 198/33 AA |
| 3,881,605 | 5/1975 | Grossman | 214/1 CM |
| 4,058,236 | 11/1977 | Brennan | 221/163 |
| 4,445,310 | 5/1984 | Scheidegger | 53/485 |
| 4,505,623 | 3/1985 | Mulder | 406/114 |
| 4,959,944 | 10/1990 | Heisler | 53/313 |
| 5,165,215 | 11/1992 | Menayan | 53/292 |
| 5,382,117 | 1/1995 | Rings et al. | 406/39 |
| 5,437,361 | 8/1995 | Ohmori et al. | 198/465.1 |

FOREIGN PATENT DOCUMENTS

| | | | |
|---|---|---|---|
| 0371436 | 6/1990 | European Pat. Off. | 406/116 |
| 2195975A | 4/1988 | United Kingdom . | |

*Primary Examiner*—Kenneth W. Noland
*Attorney, Agent, or Firm*—Woodcock Washburn Kurtz Mackiewicz & Norris LLP

[57] ABSTRACT

A closure transferring device and method are provided. The closure transferring device has a main frame, a transferring member, and an air conveying system. The transferring member rotates while transferring closures from a first station, such as a bulk shipping bin, to a second station, such as a capper hopper. The device preferably has a movable bin adapted to contain closures in cooperation with the transferring member. A method for transferring closures is also provided.

8 Claims, 2 Drawing Sheets

SYSTEM AND METHOD FOR BULK HANDLING CLOSURES

FIELD OF THE INVENTION

The present invention relates to apparatus for applying closures to beverage containers. More particularly, the present invention relates to a system and method for transferring closures directly from a closure bin to a second station.

BACKGROUND OF THE INVENTION

In a typical bottling operation, bottle closures, such as plastic bottle caps, are conveyed from a ground level container or bin to a capper hopper which may be 15 feet above ground level and 100 feet away from the ground level container. It is known in the art to convey the closures from the ground level container through a tube to the capper hopper using an air conveying system.

A conventional ground level container is typically a fixed bin located under the air conveying system. The tube extends from the fixed bin to the capper hopper. The bottler or other operator loads the fixed bin with closures which are typically delivered to the bottler in disposable shipping boxes. The operator empties the closures out of the shipping boxes into the fixed bin and discards the shipping boxes. The closures are metered from the fixed bin to an infeed hopper and then air conveyed through the tube to the capper hopper.

This type of closure apparatus has several drawbacks. One drawback with this type of apparatus is that when the closures need to be changed for any reason, the closures must be removed manually from the bin. This operation is relatively time consuming and adds costs to the overall capping operation. It would, therefore, be desirable to provide a closure transferring method and apparatus that is more efficient.

Another drawback is that after the fixed bin is emptied during operation, the bin must be manually refilled. This operation is relatively time-consuming and adds costs to the overall production costs. It would, therefore, be desirable to provide a closure transferring apparatus that is more efficient.

SUMMARY OF THE INVENTION

The present invention satisfies the above described needs in the art by providing a more efficient closure transferring device and method. The closure transferring device comprises a main frame, a transferring member, and an air conveying system. The transferring member is movably coupled to the main frame and adapted to move in an angular direction while transferring closures from a first station, such as a bulk shipping bin, to a second station, such as a capper hopper.

In a preferred embodiment, the transferring member is a telescoping tube adapted to move in a relative longitudinal direction along the main frame. The telescoping tube has an inner tube mechanically coupled to the main frame, and an outer tube slidably coupled to the inner tube such that the outer tube is free to slide axially along the inner tube.

The air conveying system is coupled to the main frame and is in communication with the transferring member. The air conveying system causes a pressure differential within the transferring member such that the closures are transferred through the transferring member from the first station to the second station. In a preferred embodiment, the air conveying system comprises a push-pull venturi air conveying system.

A method for transferring closures is also provided. According to the inventive method, closures are transferred from a first station to a second station by setting the transferring member in a first position, placing a removable bin adapted to contain closures in cooperation with the transferring member, moving the transferring member to a second position proximate the closures, activating the air conveying system to begin transferring closures from the first station to the second station, deactivating the air conveying system to stop transferring closures, returning the transferring member to the first position, and removing the bulk shipping container. In a preferred embodiment, the transferring member is rotated while closures are being transferred.

BRIEF DESCRIPTION OF THE DRAWINGS

The present invention will be better understood, and its numerous objects and advantages will become apparent by reference to the following detailed description of the invention when taken in conjunction with the following drawings, wherein like reference numerals correspond to like elements, in which.

DETAILED DESCRIPTION OF THE PREFERRED EMBODIMENT

Figure 1:
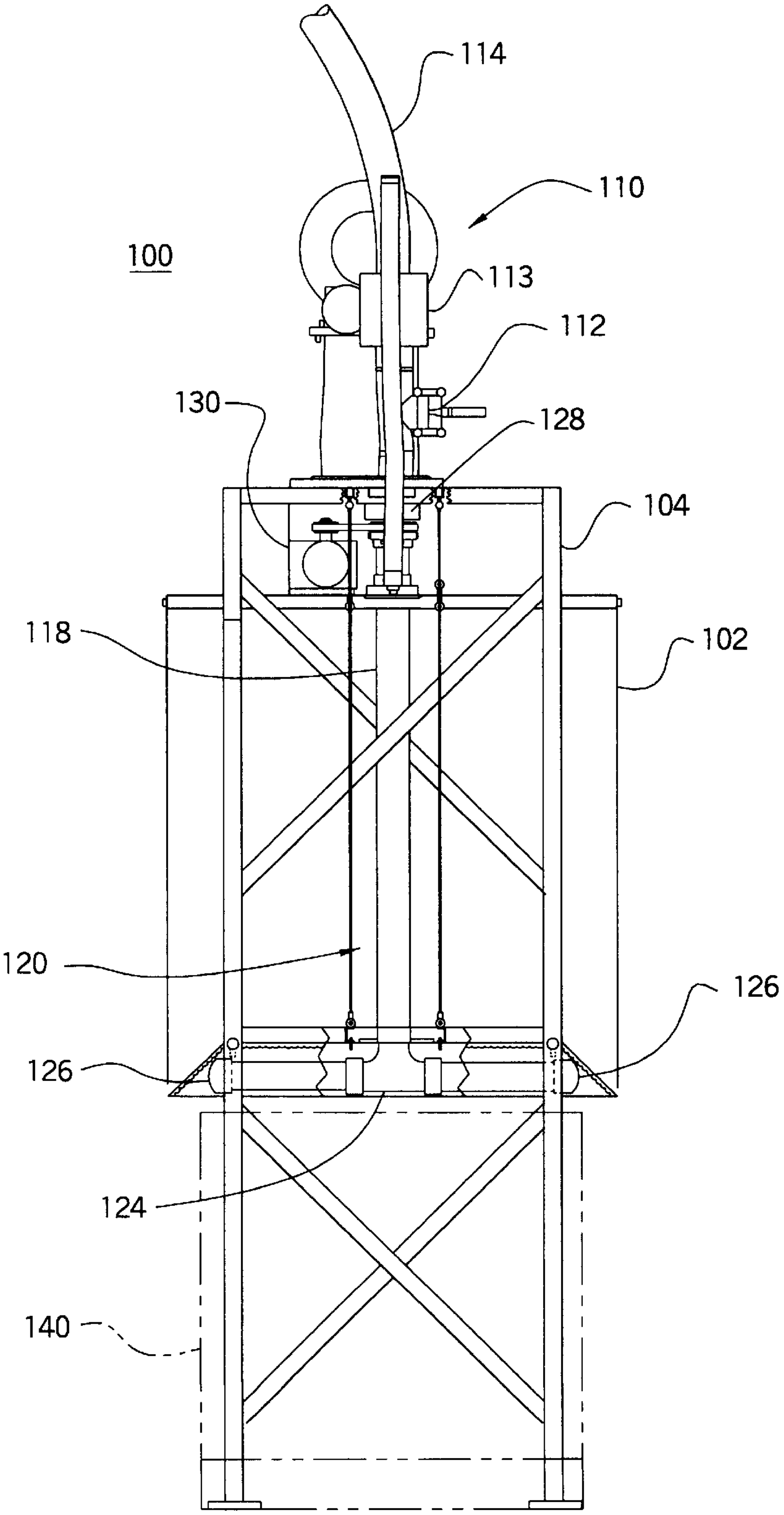
FIG. 1 shows a closure bulk handling system according to the principles of the present invention.

As shown in FIG. 1, a closure bulk handling system 100 comprises an air conveying system 110, a transferring member 120, and a drive system 130, each of which is coupled to a main frame 104. Drive system 130 is preferably an electrical device, such as a motor, which is known to those skilled in the art. Transferring member 120 is electrically coupled to drive system 130. A gate 102 is slidably connected to main frame 104.

In a preferred embodiment as shown in FIG. 1, transferring member 120 is a telescoping tube comprising an outer tube 118 and a concentrically disposed inner tube 116. The top of inner tube 116 is mechanically coupled to main frame 104. Outer tube 118 is slidably coupled to inner tube 116 such that outer tube 118 is free to slide axially along inner tube 116. Preferably, a pneumatic device is used to cause outer tube 118 to move upward along inner tube 116, while downward motion is effected by gravity. In a preferred embodiment, weights are used to counterbalance transferring member 120 through its axial motion. Outer tube 118 is fixedly coupled to inner tube 116 in the angular direction such that outer tube 118 is not free to rotate independent of inner tube 116. In a preferred embodiment of the present invention, a rotation device 122 is coupled to main frame 104 and to inner tube 116. Rotation device 122 is also electrically coupled to drive system 130 to cause rotational motion in transferring member 120. Since inner tube 116 and outer tube 118 are fixedly coupled in the angular direction, rotational motion in inner tube 116 is translated into coaxial rotational motion in outer tube 118.

Transferring member 120 has a distal end 124. Preferably, distal end 124 is a generally "T" shaped body and has a distal tip 126 on each end of the body as shown. Distal tip 126 is preferably a hollow, cylindrical tube adapted to receive closures from a station 140, such as a movable bin. In a preferred embodiment, distal tip 126 has holes in the side and bottom for receiving closures. It is noted that distal end 124 may be any shape capable of receiving closures, for example, "L" shaped. Additionally, the number of distal tips 126 may vary depending on the shape of distal end 124.

Air conveying system 110 comprises a vacuuming device 113 which is coupled to main frame 104, an air conveyance conduit 114 emanating from vacuuming device 113, and a vacuum break 112. Air conveyance conduit 114 extends to a delivery station (not shown), such as a capper hopper. Transferring device 120 is in communication with air conveying system 110 such that a closure located in movable bin 140 may be received by transferring device 120 and, in turn, transferred through transferring device 120, through vacuuming device 113, and through air conveyance conduit 114 to the delivery station.

In a preferred embodiment, air conveyance conduit 114 is a hollow, cylindrical tube, but can be any conduit capable of receiving closures and transferring them to the delivery location. Vacuuming device 113 is preferably a pull-push venturi air conveying system, which is known to those skilled in the art, but can be any conveying system capable of creating suction in transferring member 120 and pressure in air conveyance conduit 114 to cause a closure to be transferred from station 140 to the delivery station. Vacuum brake 112 is adapted to disrupt the vacuum when activated.

The system of the present invention is used according to the following method. With gate 102 and transferring member 120 both in a raised position as shown in FIG. 1, a bottler or other operator places a movable bulk shipping container 140, within main frame 104 under transferring member 120. Gate 102 is lowered around container 140 to keep container 140 from moving during operation. Similarly, transferring member 120 is lowered into station 140. In a preferred embodiment, outer tube 118 moves axially downward over inner tube 116 until distal end 126 comes to rest proximate the closures within container 140.

Air conveying system 110 causes closures to be vacuumed out of container 140 and transferred through transferring member 120 and then through air conveyance conduit 114 to a delivery station (not shown), such as a capper hopper. Preferably, drive system 130 also activates rotation device 128, causing transferring member 120 to move in an angular direction. This angular movement, which preferably occurs whenever closures are being transferred, is preferred since it provides an efficient approach to emptying the bulk shipping container. As the closures are transferred out of station 140, transferring member 120 extends toward the bottom of station 140. Once all closures have been transferred out of station 140, transferring member 120 will have been extended such that distal end 124 is proximate the bottom of container 140.

Figure 2:
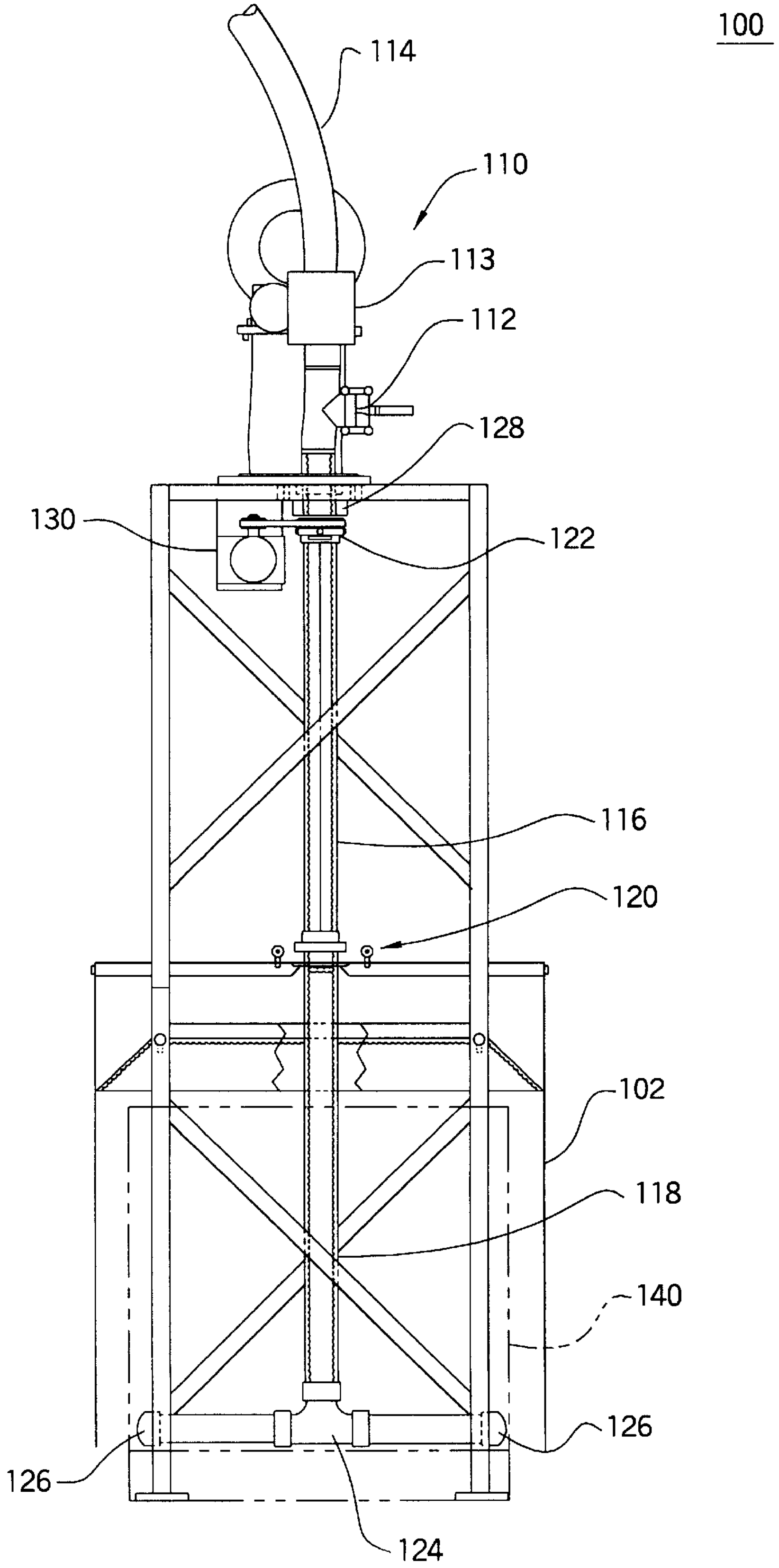
FIG. 2 shows an alternative view of the closure bulk handling system shown in FIG. 1.

FIG. 2 shows the system of the present invention after closures have been transferred from container 140 to the delivery station (not shown). As shown in FIG. 2, gate 102 is in a lowered position and transferring member 120 has been extended proximate the bottom of container 140. In the embodiment shown, in which transferring member 120 is a telescoping tube, outer tube 188 has moved axially over inner tube 116 from a raised position to a lowered position.

When the operator desires to change the type of closure being transferred, the operator can stop the transferring process. Transferring member 120 is returned to a raised position, as is gate 102. Container 140 is then removed from under transferring member 120 and another container can be substituted. Then, the transferring process can be repeated.

It is important to note that, in contrast to currently available bulk handling systems, the empty bulk shipping container is replaced with a bulk shipping container which is filled with closures.

While the invention has been described and illustrated with reference to specific embodiments, those skilled in the art will recognize that modification and variations may be made without departing from the principles of the invention as described hereinabove and set forth in the following claims.

I claim:

1. A closure transferring device, comprising:

a main frame;

a transferring member, said transferring member movably coupled to said main frame, said transferring member adapted to move in an angular direction while receiving a closure and transferring said closure from a first station to a second station; and an air conveying system, said air conveying system coupled to said main frame, said air conveying system in communication with said transferring member to cause a pressure differential within said transferring member such that said closure is received and transferred through said transferring member from said first station to said second station.

2. The transferring device of claim 1, wherein said transferring member is adapted to move in a relative longitudinal direction along said main frame.

3. The transferring device of claim 1, wherein said transferring member comprises:

an inner tube, said inner tube mechanically coupled to said main frame; and an outer tube, said outer tube slidably coupled to said inner tube such that said outer tube is free to slide axially along said inner tube from a first position to a second position.

4. The transferring device of claim 1, wherein said air conveying system comprises a pull-push venturi air conveying system.

5. The transferring device of claim 1, further comprising:

a movable bin adapted to contain said closures, said movable bin in cooperation with said transferring member.

6. The transferring device of claim 5, wherein said movable bin is a closure bulk shipping container.

7. A method for transferring closures, comprising:

setting a transferring member in a first position, said transferring member movably coupled to a main frame, said transferring member adapted to move in an angular direction while receiving a closure and transferring said closure from a first station to a second station;

placing a removable bin in cooperation with said transferring member, said movable bin adapted to contain said closures;

moving said transferring member to a second position wherein said transferring member is proximate said closures;

activating an air conveying system, said air conveying system coupled to said main frame, said air conveying system in communication with said transferring member to cause a pressure differential within said transferring member such that said closure is received and transferred through said transferring member from said first station to said second station;

deactivating said air conveying system to stop transferring said closures;

returning said transferring member to said first position; and removing the bulk shipping container.

8. The method according to claim 7, wherein said activating step comprises the step of rotating said transferring member while said closures cap are being transferred.

* * * * *

UNITED STATES PATENT AND TRADEMARK OFFICE

CERTIFICATE OF CORRECTION

PATENT NO. : 6,135,676
DATED : October 24, 2000
INVENTOR(S) : James Anderson

It is certified that error appears in the above-identified patent and that said Letters Patent is hereby corrected as shown below:

Column 3,
Line 49, delete "188" and insert -- 118 -- therefor.

Signed and Sealed this

Twenty-first Day of May, 2002

*Attest:*

*Attesting Officer*

JAMES E. ROGAN
*Director of the United States Patent and Trademark Office*